United States Patent [19]

Sekimura

[11] 4,433,900
[45] Feb. 28, 1984

[54] PERMANENT DISPLAY LIQUID CRYSTAL DEVICE VIA VOLTAGE APPLICATION

[75] Inventor: Nobuyuki Sekimura, Kawasaki, Japan

[73] Assignee: Canon Kabushiki Kaisha, Tokyo, Japan

[21] Appl. No.: 304,312

[22] Filed: Sep. 21, 1981

[30] Foreign Application Priority Data

Sep. 25, 1980 [JP] Japan ................... 55-134109
Sep. 25, 1980 [JP] Japan ................... 55-134110
Sep. 26, 1980 [JP] Japan ................... 55-133736
Sep. 26, 1980 [JP] Japan ................... 55-133738
Sep. 26, 1980 [JP] Japan ................... 55-133739

[51] Int. Cl.³ ................... G02F 1/137; G02F 1/133
[52] U.S. Cl. ................... 350/331 R; 350/339 R; 350/346
[58] Field of Search ................... 350/346, 350 R, 349, 350/331 R, 339 R

[56] References Cited

U.S. PATENT DOCUMENTS

| | | | |
|---|---|---|---|
| 3,642,348 | 2/1972 | Wysocki et al. | 350/346 |
| 3,680,950 | 8/1972 | Haas et al. | 350/346 |
| 3,833,287 | 9/1974 | Taylor et al. | 350/349 |
| 3,900,248 | 8/1975 | Nagasaki | 350/349 |
| 3,960,750 | 6/1976 | Moriyama et al. | 350/349 |
| 3,977,769 | 8/1976 | Tsukamoto et al. | 350/346 |
| 4,105,297 | 8/1978 | Shimizu | 350/336 |
| 4,333,708 | 6/1982 | Boyd et al. | 350/334 |

OTHER PUBLICATIONS

Demus, "Chemistry and Display Performance", *Nonemmissive Electro-Optic Displays* Plenum Press 1976, pp. 83–119.

*Primary Examiner*—John K. Corbin
*Assistant Examiner*—David Lewis
*Attorney, Agent, or Firm*—Fitzpatrick, Cella, Harper & Scinto

[57] ABSTRACT

A liquid crystal display device having a layer of liquid crystals sandwiched between a pair of substrates, of which at least one substrate is transparent, is characterized in that the liquid crystal display device comprises a fixed display pattern formed by applying a voltage to said layer of liquid crystals.

39 Claims, 7 Drawing Figures

PERMANENT DISPLAY LIQUID CRYSTAL DEVICE VIA VOLTAGE APPLICATION

BACKGROUND OF THE INVENTION

1. Field of the Invention

The present invention relates to a liquid crystal display device having fixed alphanumeric displays such as numerals, letters, marks, and the like.

2. Description of the Prior Art

Liquid crystal display devices are widely utilized in the field of clocks, portable or pocketable electronic calculators, etc. Meanwhile, it often becomes necessary for these devices to form previously fixed displays such as numerals, letters, marks, combination thereof, and the like. As an example of means to form such fixed display pattern, (as employed herein the term fixed display pattern means a permanent orientation of the liquid crystal layer) there is known the method disclosed in Japan Pat. Appl. Laid-open No. 113651/1974, wherein a bonding-spacing material is printed in the form of numerals or letters within a liquid crystal display device by a screen printing technique. According to this method, however, it is difficult to print the bonding-spacing material in the form of numerals or letters with satisfying precision. An additional disadvantage of this method is that the bonding-spacing material, when sandwiched between two electrode plates, tends to spread in the facial direction and therefore it is difficult to definitely identify small sizes of numerals or letters.

Another means to form such fixed display pattern is known wherein a transparent film on which letters or figures have been previously printed is arranged on the outside of a substrate of a display device. This method, however, has the following disadvantages: the display face is darker as much as the used film; the fixed display pattern is seen on a raised level since the fixed display face is apart by the thickness of the transparent electrode substrate from the operation display face (hereinafter such appearance is referred to as "raised appearance").

SUMMARY OF THE INVENTION

An object of the invention is to provide a liquid crystal display device incorporating a fixed display pattern exhibiting the same precision as that of the operation display pattern.

Another object of the invention is to provide a liquid crystal display device incorporating a clear fixed display pattern of numerals, letters, marks, or combination thereof.

A further object of the invention is to provide a liquid crystal display device incorporating a fixed display pattern free from "raised appearance".

These objects of the invention can be achieved by providing a liquid crystal display device incorporating a fixed display pattern formed by applying a sufficiently high voltage to the liquid crystal in the display devices.

According to the present invention, there is provided a liquid crystal display device having a layer of liquid crystals sandwiched between a pair of substrates of which at least one substrate is transparent, characterized in that the liquid crystal display device comprises a fixed display pattern formed by applying a voltage to said layer of liquid crystals.

DETAILED DESCRIPTION OF THE PREFERRED EMBODIMENT OF THE INVENTION

Figure 1:
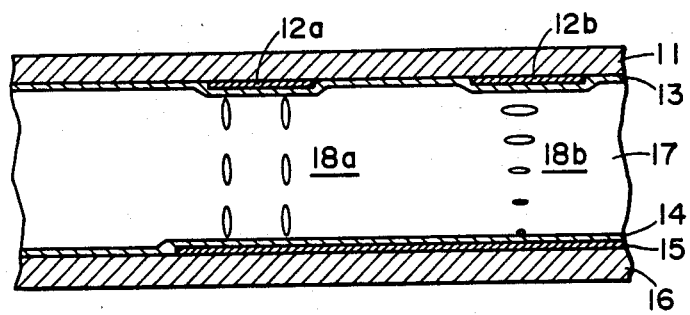
FIG. 1 is a sectional view of a liquid crystal display device of this invention, FIG. 2 a plane view thereof, FIG. 3 a graph showing the relation between applied voltage and power application time in forming a fixed display pattern according to the invention, FIGS. 4 and 5 sectional views of a guest-host liquid crystal display device of the invention, and FIGS. 6 and 7 sectional views of a pleochroic liquid crystal display device of the invention.

The liquid crystal display device of this invention has a fixed display pattern formed by applying a voltage, preferably a d.c. voltage or an a.c. voltage higher than the driving voltage for operation of display pattern, to a liquid crystal, so that the liquid crystal thereby brought to a state of alignment different from that of the surrounding liquid crystals may remain at such alignment after the applied voltage is removed.

It has been quite unexpectedly found out that liquid crystals in the state, for example, of twisted, homogeneous, homeotropic, tilted, or hybrid alignment, when a d.c. voltage or an a.c. voltage higher than the driving voltage for operation of display is applied across electrodes for a certain period, do not return to the original state of alignment after removal of the voltage. The present invention has been accomplished on the basis of this finding.

The fixed display pattern of this invention is formed by applying preferably a d.c. voltage, since the fixed display pattern can be formed with lower voltage in this case as compared with the case of applying an a.c. voltage. However, this invention, of course, available when an a.c. voltage is applied. The d.c. voltage to be applied is at least 3 V, preferably 10 V or more, and still preferably 20 V or more. The a.c. voltage to be applied is higher than the driving voltage for the operation of display, that is, at least 10 V, preferably 20 V or more. The power application time can be reduced by raising the applied voltage, of which the upper limit can be readily determined in consideration of cost by any person skilled in the art.

According to this invention, the way to form a fixed display in a liquid crystal display device is, for instance, as follows: a pair of electrodes, of which at least one is provided with a conductive alphanumeric pattern such as numerals, letters, marks, and the like, is prepared; a liquid crystal display cell is assembled by using these electrodes and other necessary members including a liquid crystal material; and then a d.c. voltage or an a.c. voltage higher than the driving voltage for the operation of display is applied between said conductive pattern and the opposite electrode for a definite time or more.

Referring now to the drawings, some embodiments of this invention are illustrated.

In FIG. 1, which shows a liquid crystal display device employing nematic liquid crystals twistedly aligned, 11 and 16 indicate a pair of substrates, 15 a conductive coating serving as a common electrode, 13 and 14 each an orienting agent or film, 17 a layer of a liquid crystal having positive dielectric anisotropy, and 12a a conductive coating in the form of numerals, letters, or the like for forming fixed display (hereinafter, such a coating is referred to as "conductive coating for forming fixed display"). When, to the liquid crystal molecules of twisted alignment existing between the conductive coating 12a and 15, there is applied a voltage higher than a level that causes the liquid crystal molecules to be brought to a state of homeotropic alignment and to remain in this state without returning to the original state of the twisted alignment even after removal of the voltage applied across the conductive coating 12a and 15, a fixed liquid crystal display pattern is formed by the liquid crystal molecules 18a brought to the homeotropic alignment. Accordingly, 18a represents the liquid crystal molecules brought to the state of homeotropic orientation wherein they remain without returning to the original twisted alignment after removal of the applied voltage. Hereinafter, such state of fixed or stable orientation of liquid crystal molecules is referred to as a state of "permanent homeotropic orientation".

On the other hand, 12b indicates a conductive coating for forming operation of liquid crystal display. When a driving voltage is applied between the conductive coatings 12b and 15, the twistedly aligned liquid crystal molecules 18b turn to homeotropic alignment, thus forming an operation display pattern. On removing the driving voltage, the homeotropically oriented liquid crystal molecules 18b return to the original state of twisted alignment and the operation display pattern disappears. The suitable driving voltage, though varying depending upon the kind of liquid crystal material used, and the like, is generally up to the saturation potential, that is, in the order of 1-15 V a.c. For the purpose of intensifying the pattern contrast, it is particularly preferred to operate the cell at the saturation potential.

The necessary level of voltage to form the liquid crystal molecules 18a in the state of "permanent homeotropic orientation", shown in FIG. 1, can be specified not absolutely since the orienting power of liquid crystals varies depending upon the kinds of liquid crystal materials and of orienting agents (films), the interaction between them, and also upon the power application time. However, generally speaking, this voltage is at least 3 V, preferably 10 V or more, for d.c. power, and at least 10 V, preferably 20 V or more, for a.c. power. Longer power application time is necessary with lower applied voltage, and vice versa.

Figure 3:
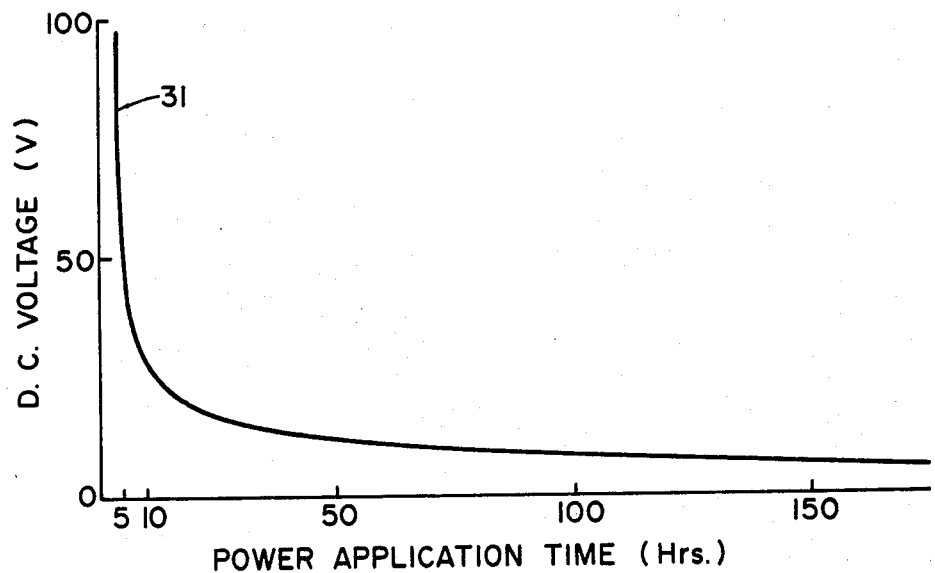

Fig 3 shows the relation between applied voltage and required power application time when a fixed display pattern is prepared by using Nematic Phase 1565 TNC Crystal (the trade name of a nematic liquid crystal mixture composed mainly of phenylcyclohexane group and biphenylcyclohexane group liquid crystal compounds, exhibiting positive dielectric anisotropy, supplied Merck A.G., West Germany) as liquid crystals and a silicon dioxide film, as an orienting film, subjected to a unidirectional rubbing treatment. Curve 31 in FIG. 3 was obtained by plotting the applied voltage vs. the power application time, required to form the molecules 18a, which assume "permanent homeotropic alignment". As shown in FIG. 3, the applied voltage and power application time vary depending upon the kinds of both liquid crystal material and orienting film used. However, applied voltage-power application time relations similar to curve 31 can be seen in the liquid crystal modes, mentioned below, other than said twisted nematic liquid crystal mode.

Figure 4:
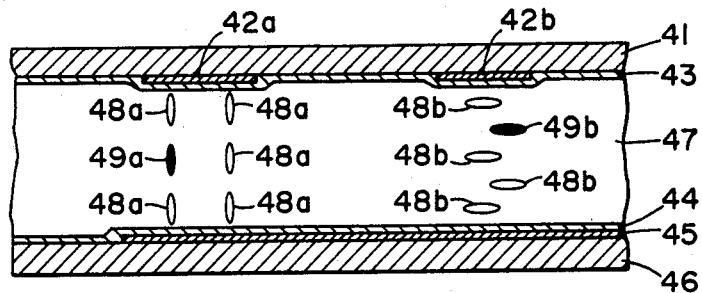

FIG. 4 shows a guest-host liquid crystal display device employing nematic liquid crystal materials having positive dielectric anisotropy, wherein 41 and 46 indicate substrates, 45 a conductive coating surving as a common electrode, 43 and 44 each an orienting agent or film, 47 a layer of the liquid crystals having positive dielectric anisotropy containing a dichroic dye dissolved, and 42a a conductive coating for forming fixed display. When, to the liquid crystal molecules of homogeneous or twisted alignment existing between the conductive coating 42a and 45, there is applied a voltage higher than a level that causes the liquid crystal molecules to be brought to a state of homeotropic alignment and to remain in this state without returning to the original state of the homogeneous or twisted alignment even after removal of the voltage applied across the conductive coating 42a and 45, a cloudy fixed display pattern is formed, on colored background with liquid crystal molecules 48a and a dichroic dye 49a which are brought to a state of homeotropic orientation. Accordingly, 48a represents the liquid crystal molecules brought to the state of homeotropic orientation wherein they remain without returning to the original homogeneous or twisted alignment after removal of the applied voltage. Hereinafter, such state is referred to as a state of "permanent homeotropic orientation". On the other hand, 42b indicates a conductive coating for forming operation display of liquid crystal. When a driving voltage is applied across the conductive coatings 42b and 45, the liquid crystal molecules 48b and dichroic dye molecules 49b in the state of homogeneous or twisted alignment turn to homeotropic orientation, thus forming an operation display pattern. On removing the driving voltage, the homeotropically oriented liquid crystal molecules return to the original state of homogeneous or twisted alignment and the operation display pattern disappears. The suitable driving voltage, though varying depending upon the kind of liquid crystal material used, and the like, is generally up to the saturation potential, that is, in the order of 1-15 V a.c.

The necessary level of voltage to form the liquid crystal molecules 48a in the state of "permanent homeotropic orientation", shown in FIG. 4, can be specified not absolutely since the orienting power of liquid crystals varies depending upon the kinds of liquid crystal materials and of orienting agents (films), the interaction between them, and also upon the power application time. However, generally speaking, this voltage is at least 3 V, preferably 10 V or more, for d.c. power, and at least 10 V, preferably 20 V or more, for a.c. power. Longer power application time is necessary with lower applied voltage, and vice versa.

The typical liquid crystal materials usable for the display devices of the types shown in FIGS. 1 and 4 include those nematic having positive dielectric anisotropy, including Shiff's bases type, biphenyl type, azoxy type, ester type and cyclohexane type nematic compounds, and the like. The specific examples are as follows:

Np-(1) Mixture (Shiff's base type) of

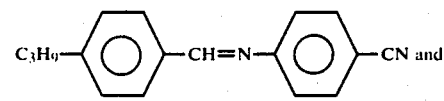

-continued

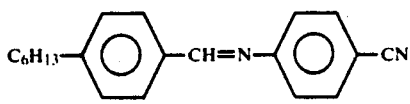

Np-(2) Mixture (biphenyl type) of

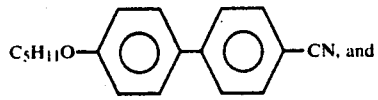

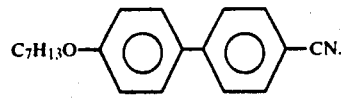

Np-(3) Mixture (azoxy type) of

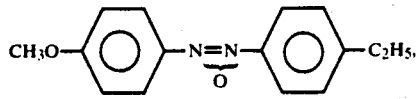

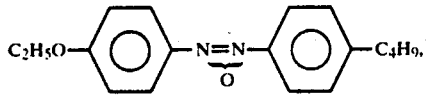

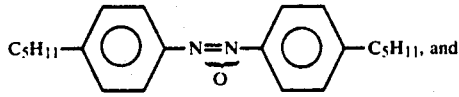

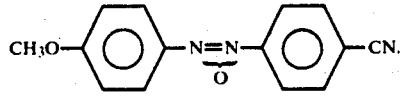

Np-(4) Mixture (ester type) of

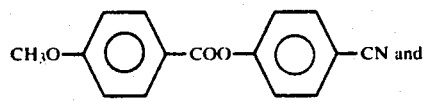

-continued

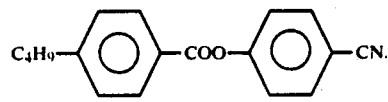

Np-(5) Mixture (cylohexane type) of

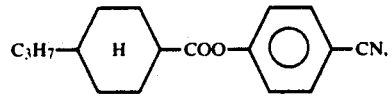

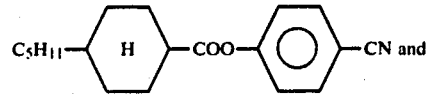

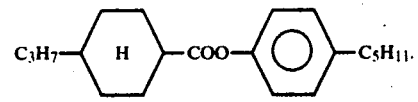

Np-(6) Mixture (Shiff's base type) of

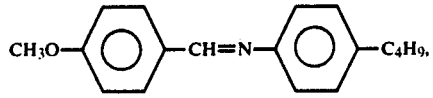

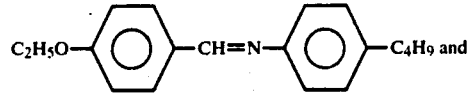

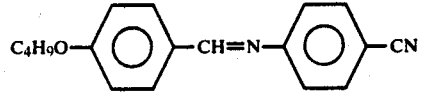

NP-(7) Mixture of

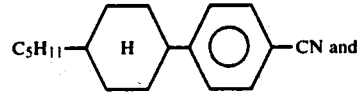

(phenylcylohexane type)

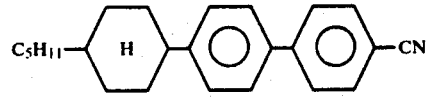

(biphenylcyclohexane type)

These mixed crystals may contain a small amount of cholesteric liquid crystal compound.

Dichroic dyes usable for the guest-host type of liquid crystal display devices, as shown in FIG. 4, of this invention can be selected from a wide range of compounds.

The specific examples are as follows:

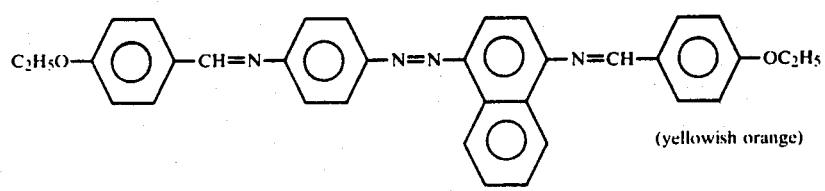

(a)

(yellowish orange)

-continued
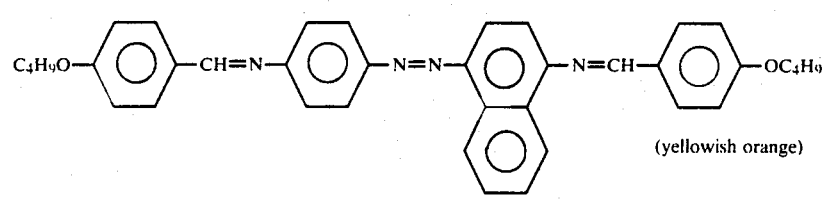
(b) (yellowish orange)
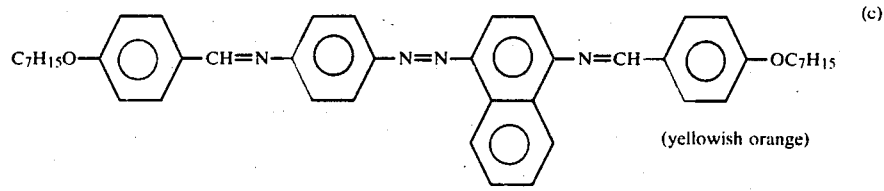
(c) (yellowish orange)
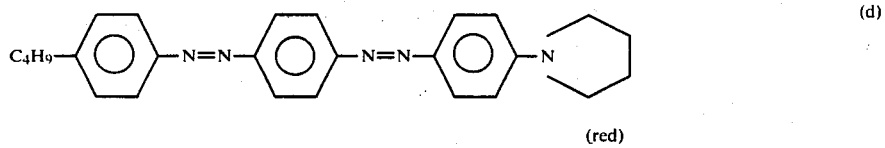
(d) (red)
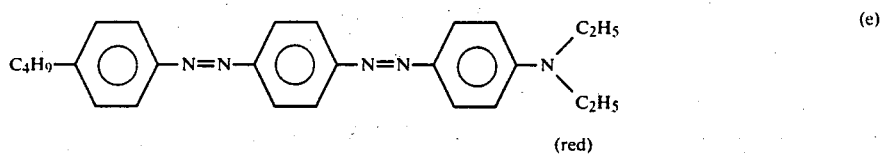
(e) (red)
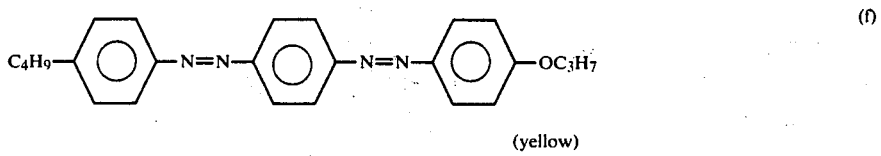
(f) (yellow)
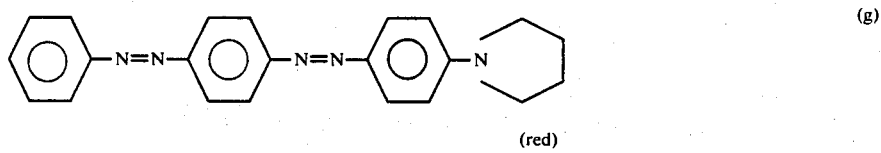
(g) (red)
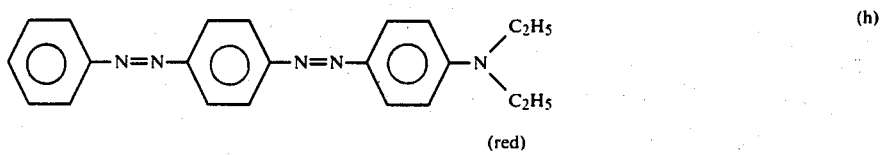
(h) (red)
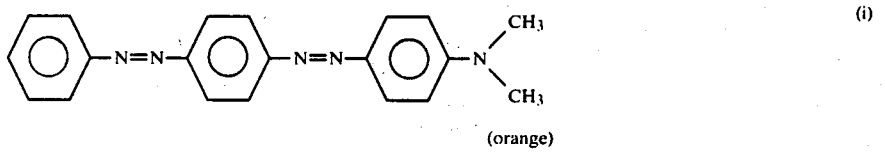
(i) (orange)
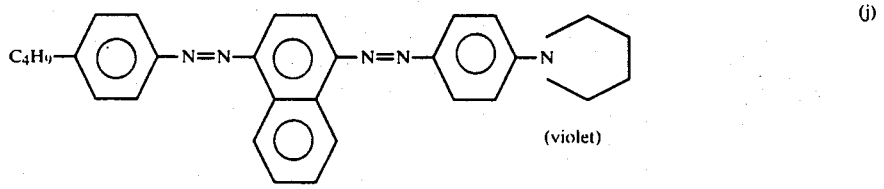
(j) (violet)

-continued
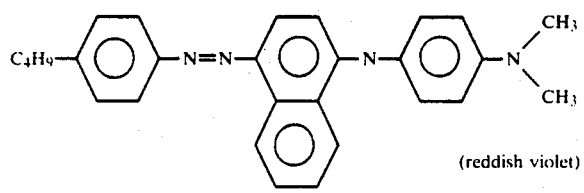
(reddish violet) (k)
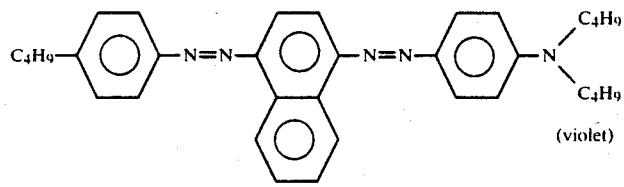
(violet) (l)
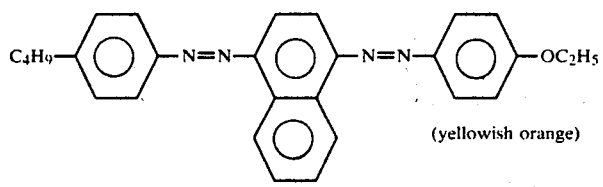
(yellowish orange) (m)
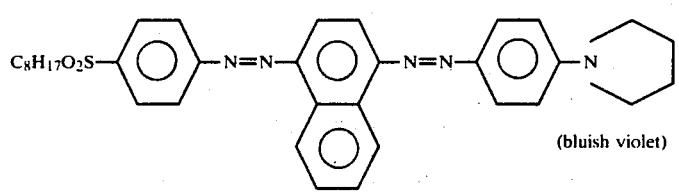
(bluish violet) (n)
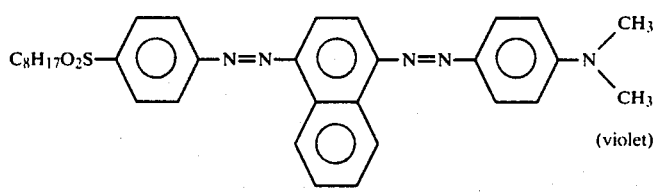
(violet) (o)
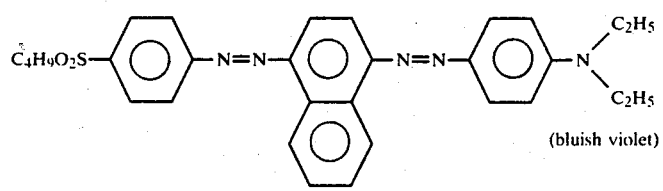
(bluish violet) (p)
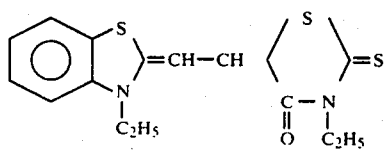
(bluish green) (q)
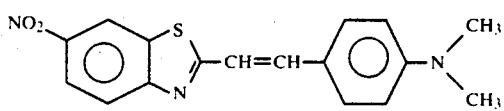
(yellowish orange) (r)

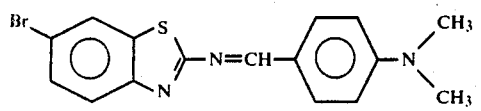

(yellow)

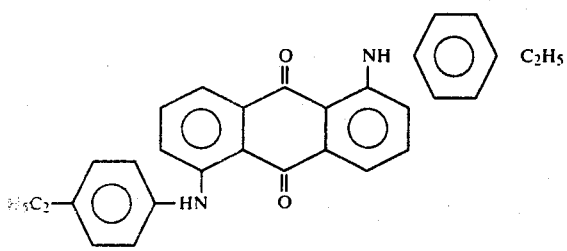

(violet)

Of these dichroic dyes, anthraquinone dyes are particularly preferred.

This invention can also be applied to the formation of a fixed display pattern in guest-host type of liquid crystal display devices employing nematic liquid crystals having negative dielectric anisotropy.

Figure 5:
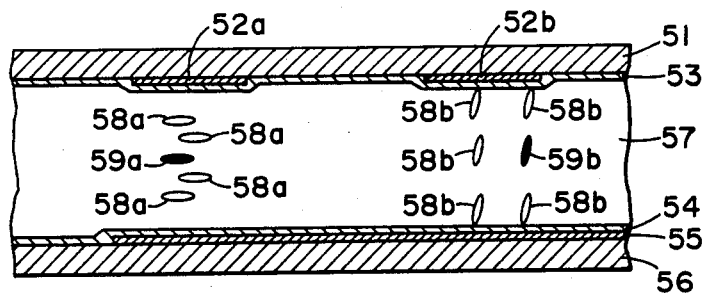

FIG. 5 shows a sectional view of a guest-host type of liquid crystal display device according to this invention employing nematic liquid crystals having negative dielectric anisotropy.

In FIG. 5, 51 and 56 indicate substrates, 55 a conductive coating serving as a common electrode, 53 and 54 each an orienting agent or film, 57 a layer of liquid crystals having negative dielectric anisotropy, which contain a dichroic dye dissolved, and 52a a conductive coating for forming fixed display. When, to the liquid crystal molecules of homeotropic or tilted alignment existing between the conductive coating 52a and 55, there is applied a voltage higher than a level that causes the liquid crystal molecules to be brought to a state of homogeneous alignment and to remain in this state without returning to the original state of the homeotropic or tilted alignment even after removal of the voltage applied across the conductive coating 42a and 55, a fixed color display pattern is formed with the molecules, liquid crystal 58a and dichroic dye 59a, brought to a state of "permanent homogeneous orientation" from the original state of homeotropic or tilted alignment. Accordingly, 58a and 59a represents the liquid crystal molecules brought to the state of homogeneous orientation wherein they remain without returning to the original homeotropic or tilted alignment after removal of the applied voltage. Hereinafter, such state is referred to as a state of "permanent homogeneous orientation".

On the other hand, 52b indicates a conductive coating for forming operation display of liquid crystal. When a driving voltage is applied across the conductive coatings 52b and 55, the liquid crystal molecules 58b and dichroic dye molecules 59b in the state of homeotropic or tilted alignment turn to homogeneous orientation, thus forming an operation display pattern. On removing the driving voltage, the homogeneously aligned liquid crystal molecules return to the original state of homeotropic or tilted alignment and the operation display pattern disappears. The suitable driving voltage, though varying depending upon the kind of liquid crystal material used, and the like, is generally up to the saturation potential, that is, in the order of 1–15 V a.c.

The necessary level of voltage to form the liquid crystal molecules 58a and the dichroic dye 59a in the state of "permanent homogeneous orientation", shown in FIG. 15, can be specified not absolutely since the orienting power of liquid crystals varies depending upon the kinds of liquid crystal materials and of orienting agents (films), the interaction between them, and also upon the power application time. However, generally speaking, this voltage is at least 3 V, preferably 10 V or more, for d.c. power, and at least 10 V, preferably 20 V or more, for a.c. power. Longer power application time is necessary with lower applied voltage, and vice versa.

For example, nearly the same relation as shown in FIG. 3 is seen between applied voltage and required power application time when electrode plates having a coat of p-methoxybenzoic acid as the orienting agent and a solution of an anthraquinone type dye in p-azoxyanisole as the liquid crystal material are used.

The typical liquid crystal materials having negative dielectric anisotropy usable in this invention include the following nematic type of compounds:

Azoxy type

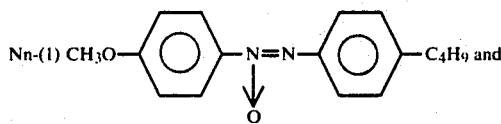

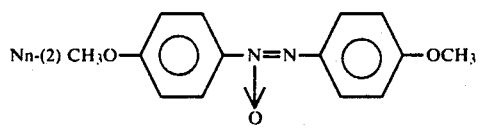

Benzylideneaniline type

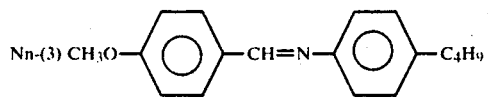

-continued

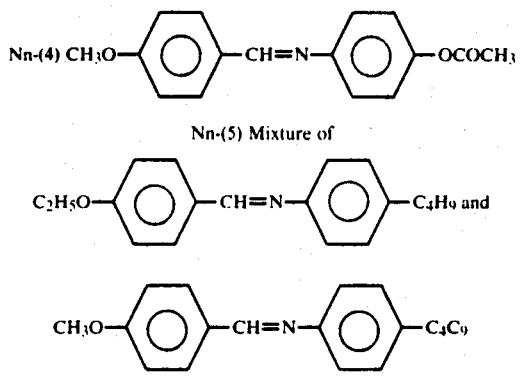

Besides these liquid crystals, those of cholesteric type and smectic type may be used.

These liquid crystals can be incorporated with suitable orienting agents, for example, organic chlorosilanes, organic alkoxysilanes, organic silanols, fatty acids, fatty acid esters, p-amino-benzoic acid, p-butylbenzoic acid, p-methoxybenzoic acid, p-benzylideneaminobenzoic acid, p-hydroxybenzoic acid, 3,5-dihydroxybenzoic acid, 3,4,5-trihydroxybenzoic acid, trifluoromethyl-trimethoxysilane, and fluorine-containing surfactants. These orienting agents can be used in the form of coating on electrodes.

The dichroic dye used in this case can be selected from a wide variation. For example, the dichroic dyes cited above can be used, and among them anthraquinone type dyes are preferred in this case also.

Furthermore, this invention can be applied to color display systems utilizing the pleochroism of liquid crystals. This type of display device is classified into two main types: pleochroic liquid crystal display devices utilizing the dichroism of liquid crystals and the foregoing guest-host type display devices utilizing the dichroism of dye. Each of the two types of display device is further divided two types, one utilizing nematic liquid crystals exhibiting positive dielectric anisotropy and the other utilizing those exhibiting negative dielectric anisotropy. Nematic liquid crystals having positive dielectric anisotropy are known to assume so-called homogeneous alignment, wherein the liquid crystal molecules orient in parallel with the substrates, whereas nematic liquid crystals having negative dielectric anisotropy are known to assume homeotropic alignment, wherein the liquid crystal molecules orient in the direction perpendicular to the substrates or tilted alignment with a tilt angle.

In the guest-host type of liquid crystal display device, as mentioned above, a guest dichroic dye is dissolved in a host liquid crystal material with a definite alignment, the alignment of liquid crystals is controlled by an electric field to concurrently control the alignment of the dye, and the change of color intensity caused thereby is displayed through a polarizing film, whereby a colored display is conducted. In contrast, the pleochroic liquid crystal display device is different from the guest-host type of liquid crystal display device in the point that the former employs a colored liquid crystal material such as azo- and azoxy-group compounds in place of a liquid crystal material colored by means of a dichroic dye. In recent years, the development of pleochroic liquid crystal display devices has been made since this type of display device is free from the various problems involved in the guest-host liquid crystal device, that is to say, instability, fading, and electric deterioration, of dye and further dependence on the solubility of dye in liquid crystals and effect of dye on orderliness. In particular, pleochroic liquid crystals having positive dichroic anisotropy are useful since a negative colored display is possible by using them.

Figure 6:
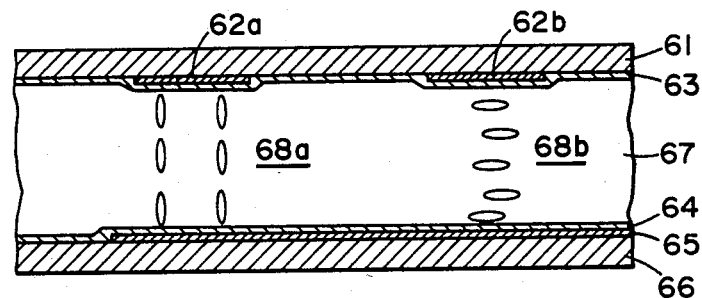

FIG. 6 shows a sectional view of a liquid crystal device of this invention employing pleochroic liquid crystals having positive dielectric anisotropy.

In FIG. 6, 61 and 62 indicate substrates, 65 a conductive coating serving as a common electrode, 63 and 64 each an orienting agent or film, 67 a layer of the pleochroic liquid crystals having positive dielectric anisotropy, and 62a a conductive coating for forming fixed display. When, to the liquid crystal molecules of homogeneously alignment existing between the conductive coating 62a and 65, there is applied to voltage higher than a level that causes the liquid crystal molecules to be brought to a state of homeotropic alignment and to remain in this state without returning to the original state of the homogeneous alignment even after removal of the voltage applied across the conductive coating 62a and 65, a fixed liquid crystal display pattern is formed by the liquid crystal molecules 68a brought to the homeotropic alignment. Accordingly, 68a represents the liquid crystal molecules brought to the state of homeotropic orientation wherein they remain without returning to the original homogeneous alignment after removal of the applied voltage. Hereinafter, such state is referred to as a state of "permanent homeotropic orientation". On the other hand, 62b indicates a conductive coating for forming operation display of liquid crystal. When a driving voltage is applied across the conduction coatings 62b and 65, the homogeneously aligned liquid crystal molecules 68b turn to homeotropic alignment, thus forming an operation display pattern. On removing the driving voltage, the homeotropically oriented liquid crystal molecules 68b return to the original state of homogeneous alignment and the operation display pattern disappears. The suitable driving voltage, though varying depending upon the kind of liquid crystal material used, and the like, is generally up to the saturation potential, that is, in the order of 1–15 V a.c.

The necessary level of voltage to form the liquid crystal molecules 68a in the state of "permanent homeotropic orientation", shown in FIG. 6, can be specified not absolutely since the orienting power of liquid crystals varies depending upon the kinds of liquid crystal materials and of orienting agents (films), the interaction between them, and also upon the power application time. However, generally speaking, this voltage is at least 3 V, preferably 10 V or more, for d.c. power, and at least 10 V, preferably 20 V or more, for a.c. power. Longer power application time is necessary with lower applied voltage, and vice versa.

Nearly the same relation as shown in FIG. 3 is seen between applied voltage and required power application period, for example, when a mixture of p-ethoxy-p'-butylazobenzene and p-heptoxy-p'-butylazobenzene (a nematic pleochroic liquid crystal composition having positive dielectric anisotropy) and a silicon dioxide coating subjected to a unidirectional rubbing treatment as the orienting film are used.

The typical nematic pleochroic liquid crystals having positive dielectric anisotropy usable in this invention include those of azo type, for example, a mixture of p-ethoxy-p'-butylazobenzene and p-hexyloxy-p'-butylazobenzene, and a composition prepared by further addition of p'-butoxybenzylidene-p-cyanoaniline to said mixture. Besides these compositions, those of smectic and cholesteric type may be used.

Figure 7:
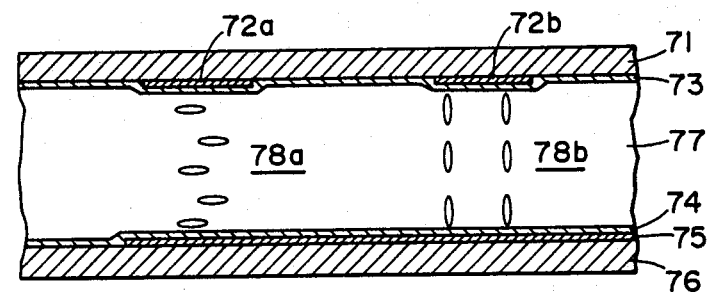

FIG. 7 shows a sectional view of a liquid crystal display device of this invention employing pleochroic liquid crystals having negative dielectric anisotropy.

In FIG. 7, 71 and 72 indicate substrates, 75 a conductive coating serving as a common electrode, 73 and 74 each an orienting agent or film, 77 a layer of the pleochroic liquid crystals having negative dielectric anisotropy, and 72a a conductive coating for forming fixed display. When to the liquid crystal molecules of homeotropic or tilted alignment existing between the conductive coating 72a and 75, there is applied a voltage higher than a level that causes the liquid crystal molecules to be brought to a state of homogeneous orientation and to remain in this state without returning to the original state of the homeotropic or tilted alignment even after removal of the voltage applied across the conductive coating 72a and 75, a fixed liquid crystal display pattern is formed by the liquid crystal molecules 78a brought to the homogeneous orientation. Accordingly, 48a represents the liquid crystal molecules brought to the state of homogeneous orientation wherein they remain without returning to the original homogeneous or twisted alignment after removal of the applied voltage. Hereinafter, such state is referred to as a state of "permanent homogeneous orientation". On the other hand, 72b indicates a conductive coating for forming operation display of liquid crystal. When a driving voltage is applied across the conductive coatings 72b and 75, the liquid crystal molecules 78b in the state of homeotropic or tilted alignment turn to homogeneous alignment, thus forming an operation display pattern. On removing the driving voltage, the homogeneously oriented liquid crystal molecules 78b return to the original state of homeotropic or tilted alignment and the operation display pattern disappears. The suitable driving voltage, though varying depending upon the kind of liquid crystal material used, and the like, is generally up to the saturation potential, that is, in the order of 1–15 V a.c.

The necessary level of voltage to form the liquid crystal molecules 78a in the state of "permanent homogeneous orientation", shown in FIG. 7, can be specified not absolutely since the orienting power of liquid crystals varies depending upon the kinds of liquid crystal materials and of orienting agents (films), the interaction between them, and also upon the power application time. However, generally speaking, this voltage is at least 3 V, preferably 10 V or more, for d.c. power, and at least 10 V, preferably 20 V or more, for a.c. power. Longer power application time is necessary with lower applied voltage, and vice versa.

Nearly the same relation as shown in FIG. 3 is seen between the applied voltage and necessary power application period for forming fixed display, for example, when p-methoxy-p'-butylazobenzene as the liquid crystals and electrode plates having a coat of p-methoxybenzoic acid as the orienting agent are used.

The typical liquid crystals usable in this case include those of pleochroic nematic liquid crystals having negative dielectric anisotropy such as p-methoxy-p'-butylazoxybenzene. Besides this liquid crystals, those of smectic and cholesteric types may be used.

These liquid crystals can be incorporated with suitable orienting agents such as organic chlorosilane, organic alkoxysilanes, organic silanols, fatty acids, fatty aicd esters, p-aminobenzoic acid, p-methoxybenzoic acid, p-benzylidene aminobenzoic acid, p-hydroxybenzoic acid, 3,5-dihydroxybenzoic acid, 3,4,5-trihydroxybenzoic acid, trifluoromethyl trimethoxysilane, and fluorine-containing surfactants. These orienting agents can also be used in the form of coating on electrode plates.

Figure 2:
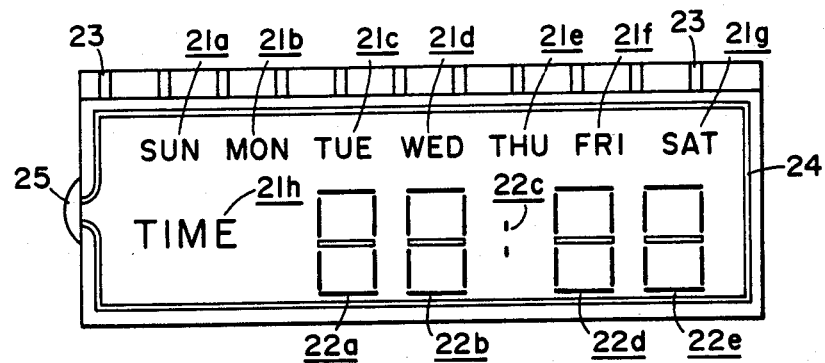

In FIG. 2, which is a plane view of a liquid crystal display device containing a fixed display according to this invention, 21a through 21h indicate the portions of fixed display letters formed, e.g., with the liquid crystal molecules, 18a in FIG. 1, which are brought to a state of "permanent homeotropic orientation", and 22a through 22e indicate the portions of operation display formed, e.g., with the liquid crystal molecules, 18b in FIG. 1, turning into homeotropical alignment temporarily from twisted alignment by applying a driving voltage. The operation display is drived by power supplied from an external circuit (not shown) through electrode terminals 23. In FIG. 2, 24 indicates a sealant formed by using a method such as screen printing and the like, and 25 a stopper. Epoxy resin base adhesives and the like can be used as the sealant 24 and the stopper 25. In the liquid crystal display devices shown in FIGS. 4–7, fixed display patterns can be formed in 21a to 21h according to the respective liquid crystal display modes.

It is desirable to use a substrate (for example, glass, plastics, and the like) having a transparent conductive film (for example, indium oxide, tin oxide, indium oxide-tin oxide containing tin oxide of 0.1–40% by weight, and the like) at least one surface thereof as electrode plates of a liquid crystal display device according to the present invention. As examples of opaque conductive film used in this invention, there are mentioned aluminum, gold, silver, copper, and lead.

In case that nematic liquid crystals having positive dielectric anisotropy is used in liquid crystal display devices of this invention, an orienting film of suitable insulative coating can be adopted. The orienting film is a coating subjected to a surface treatment such as rubbing and the like so as to be unidirectional to its face. The typical insulating coating to be used include the orienting film comprising the following inorganic or organic materials: inorganic materials such as sintered glass and silicon dioxide, and the like, and organic materials such as polyimides [producible by condensation of the following diamines and acid anhydrides: diamines, e.g., m-phenylenediamine, p-phenylenediamine, m-xylenediamine, p-xylenediamine, 4,4'-diaminodiphenyl ether, 4,4'-diaminodiphenylmethane, 4,4'-diaminodiphenyl sulfide, 4,4'-diaminodiphenyl sulfone, 1,5-diaminonaphthalene, 3,3'-dimethylbenzidine, and bis (4-β-amino-t-butylphenyl) ether; acid anhydrides, e.g., pyromellitic anhydride, 2,3,6,7-naphthalenetetracarboxylic acid anhydride, 3,3',4,4'-diphexyltetracarboxylic acid anhydride, 1,2,5,6-naphthalenetetracarboxylic acid anhydride, 2,3,4,5-thiophenetetracarboxylic acid anhydride, and 2,2-bis(3',4'-dicarboxyphenyl) propane anhydride], poly benzoxozole, poly (benzimidazole), poly (benzothiozole), poly (p-xylylene), polyolefins (e.g. polyethylene, polypropylene, etc.), poly (fluoroethylenes) and polyesters, e.g., poly (ethylene terephthalate). A coating of suitable silane coupling agent (e.g., γ-glycidoxypropyltrimethoxysilane, γ-aminopropyltrimethoxysilane, etc.) can be applied onto the interface between the conductive coating and the orienting film. Said orienting film may also contain a suitable orientation improving agent (e.g., titanium dioxide, zinc oxide, etc.). It is also possible that nematic liquid crystals having positive dielectric anisotropy to assume a twisted alignment by overlapping two orienting films unidirectionally rubbed with cloth, paper, or the like so that the rubbing directions of the two films may cross each other. Meanwhile, it is known that, in this case, application of a voltage causes the twistedly aligned liquid crystal portions where the voltage is applied to, alone to turn to homeotropic alignment. Accordingly, a positive or negative display can be conducted by arranging two polarizing plates to face the outer surfaces of the two electrode plates, respectively, sandwiching the liquid crystal layer between them, and making the polarizing axes of the polarizing plates perpendicular or parallel to each other.

It is also possible to provide a suitable insulating film on the conductive coating in the case of a liquid crystal display device employing nematic liquid crystals having negative dielectric anisotropy.

In the liquid crystal display devices of this invention, spacers, not shown in the drawings, made of glass beads, granular aluminum oxide, or glass fibers may be arranged between the two electrode plates.

Cell assembly where twisted nematic liquid crystals are used can be carried out by arranging two electrode plates subjected to a unidirectional orientation so that the orientation direction of the treated plates may cross each other at an angle of 90° or 90°±α° (α: 1-20).

A liquid crystal material is injected into the cell thus assembled, and then the inlet port is stoppered with a bonding agent of epoxy type or the like to make up the display device.

In this invention, polarizing film can be used as necessary. The suitable polarizing films are, for example, halogen-enriched film such as poly (vinyl alcohol) film containing iodine molecules aligned in a definite direction, dye-containing polarizing film such as poly (vinyl alcohol) film containing dichroic dye-molecules aligned in a definite direction, polyvinylene polarizing film having a polyene structure prepared by intramolecular dehydrochlorination of poly (vinyl chloride), metallic polarizing film, and the like. The polarizing film is arranged in a liquid crystal display device so as to make the polarizing axis parallel or perpendicular to the orienting direction of liquid crystal molecules.

This invention provides a liquid crystal display device containing a fixed display pattern having the advantages: (1) the fixed display pattern is free from "raised appearance", (2) fixed alphanumeric display pattern such as numerals, letters, marks, and the like can be clearly identified, and (3) the fixed display pattern can be carried out with the same precision as that of the operation display pattern.

This invention will be further illustrated referring to the following examples:

Example 1

A display electrode plate was prepared by patterning a transparent conductive coating of indium oxide on a glass substrate. The patterning was conducted to form an alphanumeric display such as letters, numerals, and the like, at the fixed display portions 21a to 21h and the operation display portions 22a to 22e, in FIG. 2. Then, a silane coupling agent, Ethyl Silicate-60 (a condensation product of several molecules of ethyl silicate, supplied by Nippon Colcoat Chemical Co.), was coated thereon, and converted into silicon dioxide film by heat treatment. Orientation treatment was effected by unidirectional rubbing of silicon-dioxide film face with cotton cloth.

On the other hand, a common electrode plate was prepared by patterning a transparent conductive coating of indium oxide to serve as the common electrode on a glass substrate. Then, silicon dioxide film was formed and subjected to orientation treatment, in the same manner as that for preparing the display electrode plate.

For forming a sealant 24 shown in FIG. 2, glass frit was applied along the rim of the common electrode plate by screen printing process, and after the common and display electrode plates were set face to face so that the rubbing directions of the plates might cross at right angles to each other, the glass frit was melted by heat treatment to assemble a cell. Then, a nematic liquid crystal composition of positive dielectric anisotropy, Nematic Phase 1565 TNC Crystal (mentioned in the above description referring to FIG. 1) was injected through an injection port, which was thereafter stoppered with a sealant, and a polarizing film was set in a prescribed position, thus accomplishing a nematic liquid crystal display device.

A voltage of 50 V d.c. was applied for 5 hours across the common electrode and the conductive coating for forming fixed display. This resulted in a "permanent homeotropic orientation state" of liquid crystals, forming fixed alphanumeric display at the fixed display portions 21a to 21h shown in FIG. 2.

Operation display numerals were formed by applying a driving voltage of 3 V a.c. across the common electrode and the conductive coating for forming operation display at the operation display portions, 22a to 22e.

As is evident from this example, application of a higher voltage to a layer of twisted nematic liquid crystals for more than a certain period of time results in a "permanent homeotropic orientation state" of liquid crystal molecules, as shown in FIG. 1 by 18a, which can be kept even in the state that the applied voltage is zero. This orientation state can be effectively utilized for fixed display.

Example 2

Formation of fixed display was repeated in the same manner as Example 1, except that poly (p-xylylene) was used as the orienting film in place of silicon dioxide used in Example 1, and similar results were obtained.

Example 3

Formation of fixed display was repeated in the same manner as Example 1, except that mixed liquid crystal compositions cited above, Np-(2) a biphenyl type, Np-(4) an ester type, Np-(1) a Shiff's base type, Np-(3) an azoxy type, and Np-(5) a cyclohexane type, were used separately in place of the liquid crystal composition used in Example 1, and similar results were obtained.

Example 4

Similar results to those of Example 1 were obtained by forming fixed display in the liquid crystal display device prepared in Example 1 in the same manner as Example 1, except that an applied voltage and a power application time were 200 V a.c. and 10 hours, respectively.

19

Example 5

After preparation of display and common electrode plates and application of glass frit were carried out in the same manner as Example 1, the two electrode plates were set face to face so that liquid crystal molecules might assume homogeneous alignment. The glass frit was melted by heat treatment to assemble a cell, and Nematic Phase 1565 TNC Crystal (the same liquid crystal composition as used in Example 1), in which the above-cited dichroic dye (t) (an anthraquinone-type dye) had been dissolved was injected into the cell. The injection port was stopped with a sealant, and a polarizing film was set in a prescribed position, thus accomplishing a guest-host liquid crystal display device.

A voltage of 50 V d.c. was applied for 5 hours across the common electrode and the conductive coating for forming fixed display. This resulted in a "permanent homeotropic orientation state" of liquid crystals, thereby forming cloudy fixed display letters in the fixed display portions 21a to 21h shown in FIG. 2.

Cloudy operation display numerals were formed by applying a driving voltage of 5 V a.c. across the common electrode and the conductive coating for forming operation display at portions 22a to 22e.

As is evident from this example, application of a higher voltage to a layer of guest-host liquid crystals for more than a certain period of time results in a "permanent homeotropic orientation state" of liquid crystal molecules, as shown in FIG. 4 by 48a, which can be kept stable even in the state that the applied voltage is zero. This "permanent orientation state" can be effectively utilized for fixed display.

Example 6

Formation of fixed display was repeated in the same manner as Example 5, except that poly (p-xylylene) was used as the orienting film in place of silicon dioxide used in Example 5, and similar results were obtained.

Example 7

Formation of fixed display was repeated in the same manner as Example 5, except the mixed liquid crystal compositions cited above, Np-(2) a biphenyl type, Np-(4) an ester type, Np-(3) an azoxy type, Np-(1) a Shiff's base type, and Np-(5) a cyclohexane type were used in place of the liquid crystal composition used in Example 5, and similar results were obtained.

Example 8

Similar results were obtained on forming fixed display in the guest-host liquid crystal display device prepared in Example 5 in the same manner as Example 5, except that an applied voltage and a power application time were 200 V a.c. and 10 hours, respectively.

Example 9

Formation of fixed display was repeated in the same manner as Example 5, except that the above-cited azo-type dichroic dye (i) was used in place of the anthraquinone type dichroic dye used in Example 5, and similar results were obtained.

Example 10

A display electrode plate was prepared by patterning a transparent conductive coating of indium oxide on a glass substrate. The patterning was conducted to form an alpha numeric display such as letters, numerals, and the like, at the fixed display portions 21a to 21h and the operation display portions 22a to 22e in FIG. 2. Then, p-methoxybenzoic acid was coated thereon and an orienting film was formed by drying.

On the other hand, a common electrode plate was prepared by patterning a transparent conductive coating of indium oxide to serve as the common electrode on a glass substrate. Then, the same orienting film as on the above display electrode plate was formed thereon in the same way.

Glass frit for making a sealant, as 24 in FIG. 2, was applied along the rim of the common electrode plate by screen printing process, and after the common and display electrode plates were set face to face, the glass frit was melted by heat treatment to assemble a cell. Then, the above-cited compound No. Nn-(2)(p-azoxyanisol liquid crystal material), in which the above-cited dichroic dye (t) had been dissolved, was injected through an injection port, which was then stoppered with a sealant. A polarizing film was set in a prescribed position, thus accomplishing a guest-host liquid crystal device. These liquid crystal molecules were in a tilted alignment.

A voltage of 40 V d.c. was applied for 5 hours across the common electrode and the conductive coating for forming fixed display. This resulted in a "permanent homogeneous orientation state" of liquid crystals, forming colored fixed alphanumeric display at the fixed display portions 21a to 21h shown in FIG. 2.

Operation display numerals were formed by applying a driving voltage of 5 V a.c. across the common electrode and the conductive coating for forming operation display at the operation display portions 22a to 22e.

As is evident from this example, application of a higher voltage to a layer of tilted guest-host liquid crystals for more than a certain period of time results in a "permanent homogeneous orientation state" of liquid crystal molecules, as shown in FIG. 5 by 58a, which can be kept even in the state that the applied voltage is zero. This "permanent orientation state" can be effectively utilized for fixed colored display.

Example 11

Formation of colored fixed display was repeated in the same manner as Example 10, except that a fluorine-containing surfactant $C_8F_{17}SO_2NHCH_2CH_2N^\oplus(CH_3)_3I^\ominus$ was used in place of the p-methoxybenzoic acid orienting agent used in Example 10, and similar results were obtained.

Example 12

Formation of colored fixed display was repeated in the same manner as Example 10, except that the above-cited compound No. Nn3[N-(4-methoxybenzylidene)-4-butylaniline liquid crystal compound] was used in place of the liquid crystals used in Example 10, and similar results were obtained.

Example 13

Similar results to those of Example 10 were obtained by forming a colored fixed display in the guest-host liquid crystal display device used in Example 10 in the same manner as Example 10, except that an applied voltage and a power application time were 100 V a.c. and 10 hours, respectively.

Example 14

Formation of colored fixed display was repeated in the same manner as Example 10, except that the above-cited dichroic azo-dye (i) was used in place of the anthraquinone-type dichroic dye used in Example 10, and silmilar results were obtained.

Example 15

In the same manner as Example 1, preparation of display and common electrode plates, and application of glass frit were carried out. The two electrode plates were set face to face so that the rubbing directions of the two electrodes might become parallel to each other, and the glass frit was melted by heat treatment to assemble a cell. Then, a pleochroic nematic liquid crystal composition having positive dielectric anisotropy, which comprises p-ethoxy-p'-butylazobenzene and p-hexyloxy-p'-butylazobenzene, was injected into the cell through an injection port, and the port was stoppered with a sealant. A polarizing film was set in a prescribed position, thus accomplishing a pleochroic liquid crystal display device.

A voltage of 40 V d.c. was applied for 5 hours across the common electrode and the conductive coating for forming fixed display. This resulted in a "permanent homeotropic orientation state" of liquid crystals, thereby forming colorless fixed display letters in the fixed display portions 21a to 21h shown in FIG. 2.

Operation display numerals were formed by applying a driving voltage of 7 V a.c. across the common electrode and the conductive coating for forming operation display in the portions 22a to 22e.

As is evident from this example, application of a higher voltage to a layer of pleochroic nematic liquid crystals for more than a certain period of time results in a "permanent homeotropic orientation state" of liquid crystal molecules, as shown in FIG. 6 by 68a, which can be kept stable even in the state that the applied voltage is zero. This "permanent orientation state" can be effectively for fixed display.

Example 16

Formation of fixed display was repeated in the same manner as Example 15, except that poly (p-xylylene) coating was used in place of the silicon dioxide orienting film used in Example 15, and similar results were obtained.

Example 17

Similar results to those of Example 15 were obtained by forming fixed display in the pleochroic liquid crystal display device prepared in Example 15 in the same manner as Example 15, except that an applied voltage and a power application time were 200 V a.c. and 10 hours, respectively.

Example 18

The same liquid crystal display cell as of Example 10 was assembled. A nematic liquid crystal material comprising p-methoxy-p'-butylazoxybenzene was injected through an injection port, which was then stoppered with a sealant. A polarizing film was set in a prescribed position, thus accomplishing a positive pleochroic liquid crystal display device, wherein liquid crystal molecules were in tilted alignment.

A voltage of 40 V d.c. was applied for 5 hours across the common electrode and the conductive coating for forming fixed display. This resulted in a "permanent homogeneous orientation state" of liquid crystals, forming colored fixed display letters in the portions 21a to 21h shown in FIG. 2.

Operation display numerals were formed by applying a driving voltage of 7 V a.c. across the common electrode and the conductive coating for forming operation display in the portions 22a to 22e.

As is evident from this example, application of a higher voltage to a layer of tilted pleochroic liquid crystals for more than a certain period of time results in a "permanent homogeneous orientation state" of liquid crystal molecules, as shown in FIG. 7 by 78a, which can be kept even in the state that the applied voltage is zero. This orientation state can be effectively utilized for fixed display.

Example 19

Formation of colored fixed display was repeated in the same manner as Example 18, except that a fluorine-containing surfactant $C_8F_{17}SO_2NHCH_2CH_2N^{\oplus}(CH_3)_3I^{\ominus}$ was used in place of the p-methoxybenzoic acid orienting agent used in Example 18, and similar results were obtained.

Example 20

Similar results to those of Example 18 were obtained by forming colored fixed display in the positive pleochroic liquid crystal display device prepared in Example 18 in the same manner as Example 18, except that an applied voltage and a power application time were 200 V a.c. and 10 hours, respectively.

What I claim is:

1. A liquid crystal display device having a layer of liquid crystals sandwiched between a pair of substrates of which at least one substrate is transparent, characterized in that the liquid crystal display device comprises a fixed display pattern formed by applying an effective voltage of at least about 3 volts D.C. or 10 volts A.C. for at least about 5 hours to provide a permanent orientation of said layer of said liquid crystals.

2. A liquid crystal display device according to claim 1, wherein the applied voltage for forming fixed display is of a.c. higher than a voltage for forming operation display.

3. A liquid crystal display device according to claim 1, wherein the applied voltage for forming fixed display is of d.c.

4. A liquid crystal display device according to claim 2, wherein the applied voltage for forming fixed display is at least 10 V of a.c.

5. A liquid crystal display device according to claim 4, wherein the applied voltage for forming fixed display is at least 20 V of a.c.

6. A liquid crystal display device according to claim 3, wherein the applied voltage for forming fixed display is at least 3 V of d.c.

7. A liquid crystal display device according to claim 3, wherein the applied voltage for forming fixed display is at least 10 V of d.c.

8. A liquid crystal display device according to claim 7, wherein the applied voltage for forming fixed display is at least 20 V of d.c.

9. A liquid crystal display device according to claim 1, wherein said liquid crystals are nematic liquid crystals having positive dielectric anisotropy.

10. A liquid crystal display device according to claim 9, wherein the liquid crystals surrounding those forming said fixed display pattern are those nematic in twisted alignment, having positive dielectric anisotropy.

11. A liquid crystal display device according to claim 9 or 10, wherein said liquid crystals are mix-type nematic liquid crystals having positive dielectric anisotropy, said mix-type nematic liquid crystals comprising a phenylcyclohexane-type liquid crystal and a biphenylcyclohexane-type liquid crystal.

12. A liquid crystal display device according to claim 9 or 10, wherein said liquid crystals are biphenyl-type nematic liquid crystals having positive dielectric anisotropy.

13. A liquid crystal display device according to claim 9 or 10, wherein said liquid crystals are those nematic of cyclohexane-type having positive dielectric anisotropy.

14. A liquid crystal display device according to claim 9 or 10, wherein said liquid crystals are those nematic of azoxy-type having positive dielectric anisotropy.

15. A liquid crystal display device according to claim 9 or 10, wherein said liquid crystals are those nematic of Shiff's-type having positive dielectric anisotropy.

16. A liquid crystal display device according to claim 9, wherein said liquid crystals are those containing a cholesteric liquid crystal.

17. A liquid crystal display device according to claim 1, wherein said liquid crystals are those containing a dichroic dye dissolved.

18. A liquid crystal display device according to claim 17, wherein said liquid are those nematic having positive dielectric anisotropy and containing a dichroic dye dissolved.

19. A liquid crystal display device according to claim 17, wherein said dichroic dye is of anthraquinone-type.

20. A liquid crystal display device according to claim 17, wherein said dichroic dye is of azo-type.

21. A liquid crystal display device according to claim 18, wherein the liquid crystals surrounding those forming said fixed display pattern are those nematic in twisted alignment, having positive dielectric anisotropy.

22. A liquid crystal display device according to claim 18, wherein the liquid crystals surrounding those forming said fixed display pattern are those nematic in homogeneous alignment, having positive dielectric anisotropy.

23. A liquid crystal display device according to claim 21 or 22, wherein said liquid crystals are mix-type nematic liquid crystals having positive dielectric anisotropy, which comprise a phenylcyclohexane-type liquid crystal and a biphenylcyclohexane-type liquid crystal compound.

24. A liquid crystal display device according to claim 21 or 22, wherein said liquid crystals are biphenyl-type nematic liquid crystals having positive dielectric anisotropy.

25. A liquid crystal display device according to claim 21 or 22, wherein said liquid crystals are those nematic of cyclohexane group, having positive dielectric anisotropy.

26. A liquid crystal display device according to claim 21 or 22, wherein said liquid crystals are azoxy-type nematic liquid crystals having positive dielectric anisotropy.

27. A liquid crystal display device according to claim 21 or 22, wherein said liquid crystals are Shiff's base-type nematic liquid crystals having positive dielectric anisotropy.

28. A liquid crystal display device according to claim 17, wherein said liquid crystals are those containing a cholesteric liquid crystal.

29. A liquid crystal display device according to claim 17, wherein said liquid crystals are those nematic having negative dielectric anisotropy.

30. A liquid crystal display device according to claim 29, wherein said liquid crystals are those nematic having negative dielectric anisotropy and containing an anthraquinone dye dissolved.

31. A liquid crystal display device according to claim 29, wherein said liquid crystals are those nematic having negative dielectric anisotropy and containing an azo-dye dissolved.

32. A liquid crystal display device according to claim 29, wherein said liquid crystal are azo-type nematic liquid crystals having negative dielectric anisotropy.

33. A liquid crystal display device according to claim 29, wherein said liquid crystals are benzylideneaniline-type nematic liquid crystal having negative dielectric anisotropy.

34. A liquid crystal display device according to claim 1, wherein said liquid crystals are of pleochroic.

35. A liquid crystal display device according to claim 34, wherein said liquid crystals are those pleochroic having positive dielectric anisotropy.

36. A liquid crystal display device according to claim 34, wherein said liquid crystals are those pleochroic having negative dielectric anisotropy.

37. A liquid crystal display device according to any of claims 10, 21 and 22, wherein each of said conductive coatings is provided with an orienting film thereon.

38. A liquid crystal display device according to claim 37, wherein said orienting films are of an organic material selected from the group consisting of polyimides, poly (benzoxazole), poly (benzothiazole), poly (benzimidazole), poly (p-xylylene), polyolefins, poly (fluoroethylenes), and polyesters.

39. A liquid crystal display device according to claim 37, wherein said orienting films are of silicon dioxide.

* * * * *

UNITED STATES PATENT AND TRADEMARK OFFICE
CERTIFICATE OF CORRECTION

PATENT NO. :    4,433,900
DATED      :    February 28, 1984
INVENTOR(S):    NOBUYUKI SEKIMURA It is certified that error appears in the above-identified patent and that said Letters Patent is hereby corrected as shown below:

Column 4, Line 4 - Change "surving" to -- serving --

Column 16, line 60 - Change "benzoxozole" to -- benzoxazole --

Column 16, line 61 - Change "benzothiozole" to
                        -- benzothiazole --

Column 21, line 37 - Change "effectively" is -- effectively
                                    utilized --

Column 16, line 2 - Change "aicd" to -- acid --

Signed and Sealed this

Twenty-ninth Day of May 1984

[SEAL]

Attest:

GERALD J. MOSSINGHOFF

Attesting Officer        Commissioner of Patents and Trademarks